US012112410B2

(12) United States Patent
Van Benthem

(10) Patent No.: US 12,112,410 B2
(45) Date of Patent: *Oct. 8, 2024

(54) CONSERVATIVE RASTERIZATION USING GRADIENTS

(71) Applicant: Imagination Technologies Limited, Kings Langley (GB)

(72) Inventor: Casper Van Benthem, Abbots Langley (GB)

(73) Assignee: Imagination Technologies Limited, Kings Langley (GB)

( * ) Notice: Subject to any disclaimer, the term of this patent is extended or adjusted under 35 U.S.C. 154(b) by 206 days.

This patent is subject to a terminal disclaimer.

(21) Appl. No.: 17/752,458

(22) Filed: May 24, 2022

(65) Prior Publication Data

US 2022/0284644 A1 Sep. 8, 2022

Related U.S. Application Data

(63) Continuation of application No. 16/950,619, filed on Nov. 17, 2020, now Pat. No. 11,373,349, which is a
(Continued)

(30) Foreign Application Priority Data

Jun. 29, 2018 (GB) ...................................... 1810718

(51) Int. Cl.
*G06T 11/40* (2006.01)
*G06T 1/20* (2006.01)
(Continued)

(52) U.S. Cl.
CPC ................ *G06T 11/40* (2013.01); *G06T 1/20* (2013.01); *G06T 7/13* (2017.01); *G06T 15/005* (2013.01);
(Continued)

(58) Field of Classification Search
CPC .......... G06T 11/40; G06T 15/005; G06T 1/20; G06T 15/30; G06T 15/503; G06T 15/40;
(Continued)

(56) References Cited

U.S. PATENT DOCUMENTS

| 5,949,428 A | 9/1999 | Toelle et al. |
| 10,235,802 B2 | 3/2019 | Barber et al. |
| 10,861,205 B2 * | 12/2020 | Van Benthem ......... G06T 11/40 |
| 2003/0142103 A1 * | 7/2003 | Hussain .................. G06T 11/40 345/545 |

(Continued)

FOREIGN PATENT DOCUMENTS

| CN | 106067187 A | 11/2016 |
| GB | 2511817 A | 9/2014 |

OTHER PUBLICATIONS

Akenine-Moller et al., "A Simple Algorithm for Conservative and Tiled Rasterization," Retrieved from the Internet: WRL:http://fileadmin.cs.lth.se/graphics/research/papers/2005/cr/_conservative.pdf; Feb. 24, 2004; pp. 1-6.
(Continued)

*Primary Examiner* — Jin Cheng Wang
(74) *Attorney, Agent, or Firm* — Potomac Law Group, PLLC; Vincent M DeLuca

(57) ABSTRACT

Conservative rasterization hardware comprises hardware logic arranged to perform an edge test calculation for each edge of a primitive and for two corners of each pixel in a microtile. The two corners that are used are selected based on the gradient of the edge and the edge test result for one corner is the inner coverage result and the edge test result for the other corner is the outer coverage result for the pixel. An overall outer coverage result for the pixel and the primitive is calculated by combining the outer coverage results for the pixel and each of the edges of the primitive in an AND gate. The overall inner coverage result for the pixel is calculated in a similar manner.

17 Claims, 9 Drawing Sheets

Related U.S. Application Data continuation of application No. 16/457,560, filed on Jun. 28, 2019, now Pat. No. 10,861,205.

(51) Int. Cl.
  *G06T 7/13* (2017.01)
  *G06T 15/00* (2011.01)
  *G06T 15/50* (2011.01)
  *G06T 15/80* (2011.01)
  *G09G 5/36* (2006.01)

(52) U.S. Cl.
  CPC ............ *G06T 15/503* (2013.01); *G06T 15/80* (2013.01); *G09G 5/363* (2013.01); *G06T 2207/20021* (2013.01); *G06T 2210/12* (2013.01); *G09G 2360/122* (2013.01)

(58) Field of Classification Search
  CPC ........... G06T 15/80; G06T 2207/20021; G06T 2210/12; G06T 7/13; G09G 2360/12; G09G 5/363
  See application file for complete search history.

(56) References Cited

U.S. PATENT DOCUMENTS

| | | |
|---|---|---|
| 2004/0207642 A1 | 10/2004 | Crisu et al. |
| 2005/0259100 A1 | 11/2005 | Teruyama |
| 2011/0234609 A1 | 9/2011 | Cai et al. |
| 2014/0015835 A1 | 1/2014 | Akenine-Moller et al. |
| 2014/0267300 A1* | 9/2014 | Barber ............... G06T 7/13 345/441 |
| 2015/0022525 A1* | 1/2015 | Grenfell ............ G06T 15/005 345/427 |
| 2015/0235340 A1 | 8/2015 | Mouri et al. |
| 2017/0287207 A1 | 10/2017 | Clarberg |
| 2017/0316604 A1 | 11/2017 | Yang et al. |
| 2018/0300915 A1* | 10/2018 | Heggelund ............ G06T 7/11 |
| 2019/0311516 A1 | 10/2019 | Van Benthem |
| 2020/0105045 A1 | 4/2020 | Van Benthem |

OTHER PUBLICATIONS

Pineda; "A Parallel Algorithm for Polygon Rasterization"; Computer Graphics, ACM, US; vol. 22; No. 4; Jun. 1 rnss; pp. 17-20, Aug. 1988.

* cited by examiner

FIG. 8A
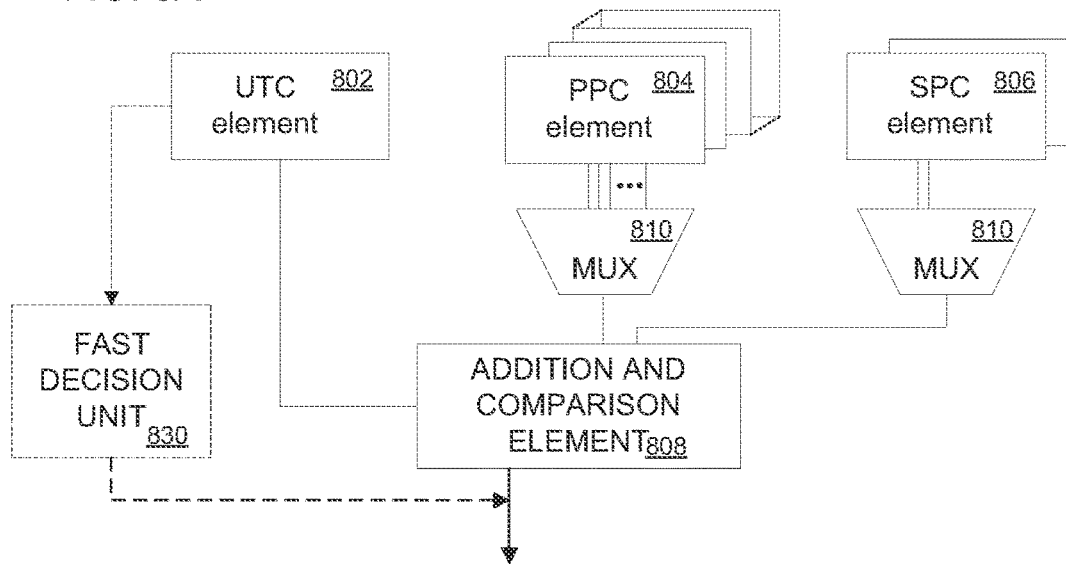
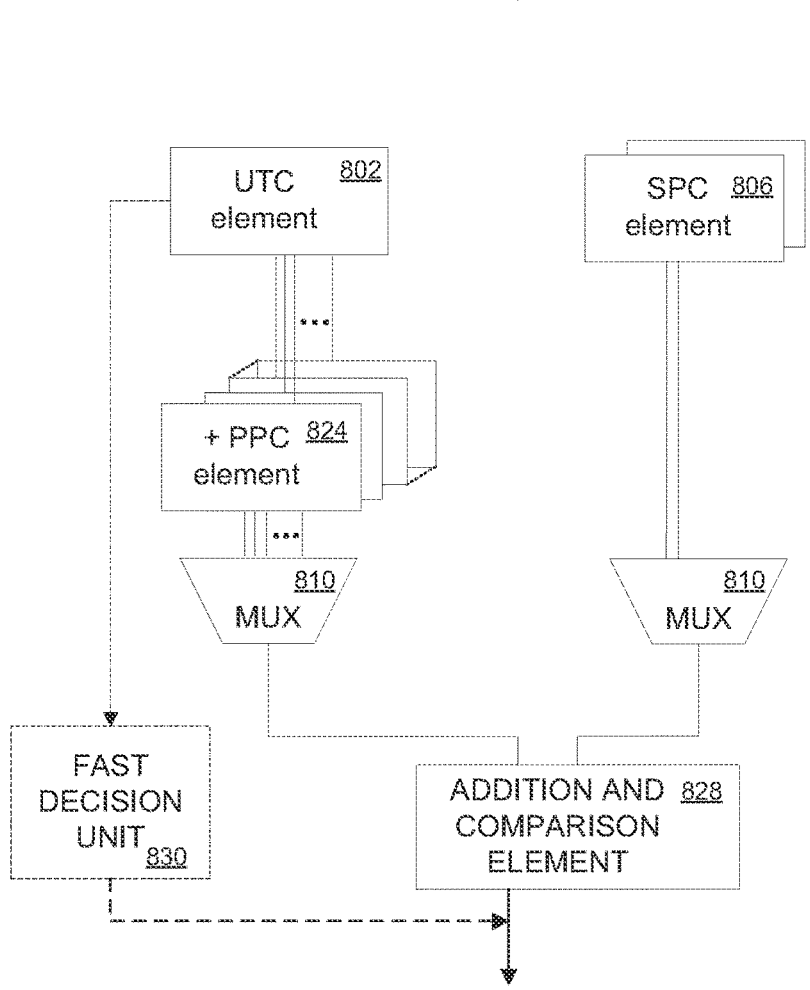
FIG. 8B

CONSERVATIVE RASTERIZATION USING GRADIENTS

CROSS-REFERENCE TO RELATED APPLICATIONS AND CLAIM OF PRIORITY

This application is a continuation under 35 U.S.C. 120 of copending application Ser. No. 16/950,619 filed Nov. 17, 2020, which is a continuation of prior application Ser. No. 16/457,560 filed Jun. 28, 2019, now U.S. Pat. No. 10,861, 205, which claims foreign priority under 35 U.S.C. 119 from United Kingdom Application No. 1810718.5 filed Jun. 29, 2018.

BACKGROUND

In computer graphics, a set of surfaces representing objects in a scene is divided up into a number of smaller and simpler pieces, (referred to as primitives), typically triangles, which are more amenable to rendering. The resulting divided surface is generally an approximation to the original surface, but the accuracy of this approximation can be improved by increasing the number of generated primitives, which in turn usually results in the primitives being smaller. The amount of sub-division is usually determined by a level of detail (LOD). An increased number of primitives is therefore typically used where a higher level of detail is required, e.g. because an object is closer to the viewer and/or the object has a more intricate shape. However, use of larger numbers of triangles increases the processing effort required to render the scene and hence increases the size of the hardware that performs the processing. Furthermore, as the average triangle size reduces, aliasing (e.g. when angled lines appear jagged) occurs more often and hence graphics processing systems employ anti-aliasing techniques which often involve taking several samples per pixel and subsequently filtering the data.

As both the number of primitives that are generated increases, the ability of a graphics processing system to process the primitives becomes more important. One known way of improving the efficiency of a graphics processing system is to render an image in a tile-based manner. In this way, the rendering space into which primitives are to be rendered is divided into a plurality of tiles, which can then be rendered independently from each other. A tile-based graphics system includes a tiling unit to tile the primitives, i.e. to determine, for a primitive, which of the tiles of a rendering space the primitive is in. Then, when a rendering unit renders the tile, it can be given information (e.g. a per-tile list) indicating which primitives should be used to render the tile.

An alternative to tile-based rendering is immediate-mode rendering. In such systems there is no tiling unit generating per-tile lists and each primitive appears to be rendered immediately; however, even in such systems, the rendering space may still be divided into tiles of pixels and rendering of each primitive may still be done on a tile by tile basis with each pixel in a tile being processed before progressing to the next tile. This is done to improve locality of memory references.

The embodiments described below are provided by way of example only and are not limiting of implementations which solve any or all of the disadvantages of known graphics processing pipelines.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A graphics processing pipeline is described which comprises conservative rasterization hardware. The conservative rasterization hardware comprises hardware logic arranged to perform an edge test calculation for each edge of a primitive and for two corners of each pixel in a microtile in parallel. The two corners that are used are selected based on the gradient of the edge and the edge test result for one corner is the inner coverage result and the edge test result for the other corner is the outer coverage result for the pixel. An overall outer coverage result for the pixel and the primitive is calculated by combining the outer coverage results for the pixel and each of the edges of the primitive in an AND gate. The overall inner coverage result for the pixel is calculated in a similar manner. This hardware may perform the coverage test precisely or may include an uncertainty region by offsetting the pixel corner positions from the actual pixel corners.

A first aspect provides a graphics processing pipeline arranged to render in a rendering space, wherein the rendering space is sub-divided into a plurality of tiles, each tile is sub-divided into a plurality of microtiles, each microtile comprising an identical arrangement of pixels, the graphics processing pipeline comprising conservative rasterization hardware and wherein the conservative rasterization hardware comprises: a plurality of first hardware sub-units each arranged to calculate, for a different edge of a primitive, an outer coverage result for the edge and an inner coverage result for the edge for each pixel in a microtile; and a plurality of second hardware sub-units each arranged to calculate, for a different pixel in a microtile, an outer coverage result for the primitive and an inner coverage result for the primitive, wherein each first hardware sub-unit comprises: quadrant selection hardware arranged to identify a first and a second pixel corner position using a gradient of a vector defining the edge of the primitive; and edge test calculation hardware arranged to calculate, for each pixel corner position in each of the pixels in the microtile a value indicating whether the pixel corner position is to the left of the edge, wherein the value for the first pixel corner position is the outer coverage result for the pixel and the value for the second pixel corner position is the inner coverage result for the pixel; and wherein each second hardware sub-unit comprises: a first plurality of AND gates, one for each pixel in the microtile, and each arranged to receive as inputs an outer coverage result for the pixel and each of the edges, one from each of the first hardware sub-units and wherein an output of the AND gate is the outer coverage result for the pixel and the primitive; and a second plurality of AND gates, one for each pixel in the microtile, and each arranged to receive as inputs an inner coverage result for the pixel and each of the edges, one from each of the first hardware sub-units and wherein an output of the AND gate is the inner coverage result for the pixel and the primitive.

A second aspect provides a method of performing conservative rasterization in a graphics pipeline arranged to render in a rendering space, wherein the rendering space is sub-divided into a plurality of tiles, each tile is sub-divided into a plurality of microtiles, each microtile comprising an identical arrangement of pixels, the method comprising: for each edge of a primitive, identifying, based on a gradient of a vector defining the edge, a first and a second pixel corner position; and for each pixel in the microtile and for each edge of the primitive, calculating a first value indicating whether the first pixel corner position is to the left of the edge, wherein the first value is an outer coverage result for the pixel; and calculating a second value indicating whether the second pixel corner position is to the left of the edge, wherein the second value is an inner coverage result for the pixel; and combining outer coverage results for the pixel for each edge of the primitive in an AND gate to generate and output an outer coverage result for the pixel and the primitive; and combining inner coverage results for the pixel for each edge of the primitive in an AND gate to generate and output an inner coverage result for the pixel and the primitive.

The graphics processing pipeline comprising conservative rasterization hardware may be embodied in hardware on an integrated circuit. There may be provided a method of manufacturing, at an integrated circuit manufacturing system, a graphics processing pipeline comprising conservative rasterization hardware. There may be provided an integrated circuit definition dataset that, when processed in an integrated circuit manufacturing system, configures the system to manufacture a graphics processing pipeline comprising conservative rasterization hardware. There may be provided a non-transitory computer readable storage medium having stored thereon a computer readable description of an integrated circuit that, when processed, causes a layout processing system to generate a circuit layout description used in an integrated circuit manufacturing system to manufacture a graphics processing pipeline comprising conservative rasterization hardware.

There may be provided an integrated circuit manufacturing system comprising: a non-transitory computer readable storage medium having stored thereon a computer readable integrated circuit description that describes the graphics processing pipeline comprising conservative rasterization hardware; a layout processing system configured to process the integrated circuit description so as to generate a circuit layout description of an integrated circuit embodying the graphics processing pipeline comprising conservative rasterization hardware; and an integrated circuit generation system configured to manufacture the graphics processing pipeline comprising conservative rasterization hardware according to the circuit layout description.

There may be provided computer program code for performing any of the methods described herein. There may be provided non-transitory computer readable storage medium having stored thereon computer readable instructions that, when executed at a computer system, cause the computer system to perform any of the methods described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which:

FIG. 8A shows a schematic diagram of a first example implementation of the edge test hardware from FIG. 3A in more detail;

FIG. 8B shows a schematic diagram of a second example implementation of the edge test hardware from FIG. 3A in more detail.

Figure 1:
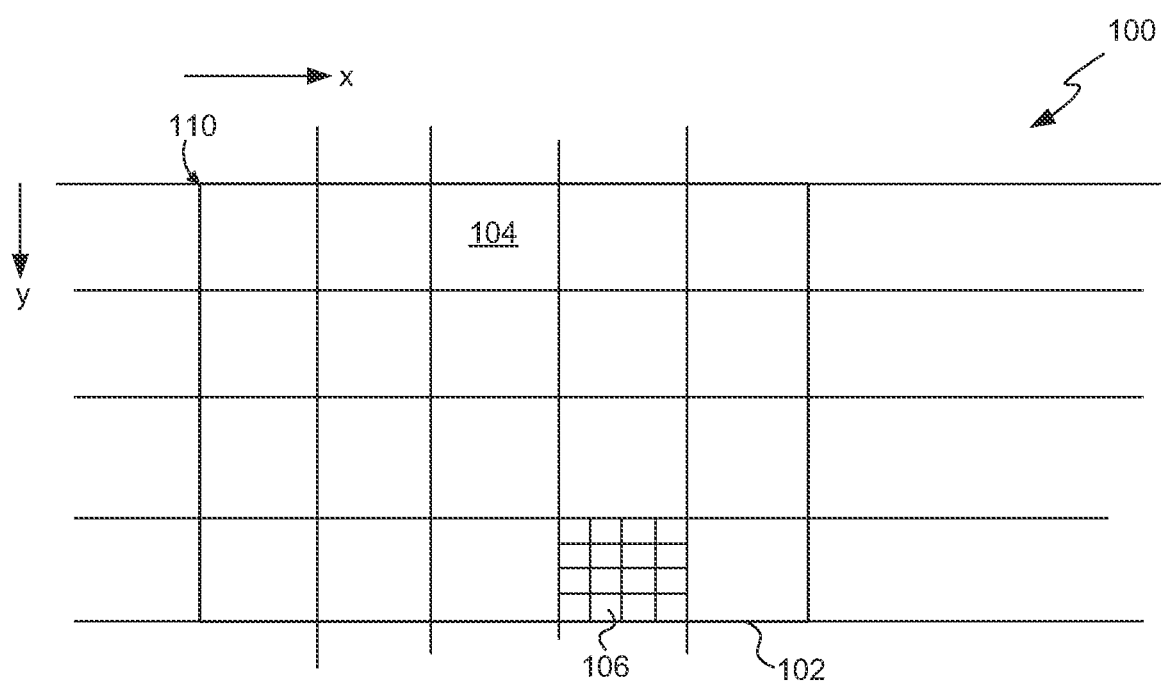
FIG. 1 is a schematic diagram of the rendering space divided into tiles and microtiles.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art.

Embodiments will now be described by way of example only.

Described herein is hardware that performs conservative rasterization. This hardware may be implemented within the rasterization phase of a graphics processing pipeline (e.g. within a graphics processing unit, GPU). Conservative rasterization involves determining whether a square pixel area is fully overlapped by a primitive (this is referred to as 'inner coverage'), partially overlapped by the primitive (this is referred to as 'outer coverage') or not overlapped at all by the primitive. The conservative rasterization hardware described herein provides an efficient way (e.g. in terms of physical size and power consumption) to obtain both outer and inner coverage results.

The hardware described herein relies on the regular sub-division of the rendering space, as can be described with reference to FIG. 1. The rendering space 100 is divided into a plurality of tiles 102 (which may, for example, be square or rectangular) and each tile is further divided into a regular arrangement of smaller areas 104, referred to as 'microtiles'. Within each tile 102 there is a pre-defined arrangement of microtiles 104 and in various examples, all of the microtiles 104 are the same size. Whilst FIG. 1 shows an arrangement of 5×4 microtiles 104 within a tile 102, in other examples there may be a different number of microtiles 104 in each tile 102. Each microtile 104 comprises the same number (and arrangement) of pixels 106. In the example shown in FIG. 1, each microtile 104 comprises a 4×4 arrangement of 16 pixels 106.

As described in detail below, the conservative rasterization hardware described herein calculates, for each edge of a primitive, an edge test result for two diagonally opposite corners of each pixel in a microtile and the edge test result for one of these two pixel corners is the outer coverage result for the edge of the primitive and the edge test result for the other of these two pixel corners is the inner coverage result for the edge of the primitive. The pixel corners that are used are selected based on the gradient of the edge vector and so are the same for the entire microtile. The outer and inner coverage results for the entire primitive (rather than just a single edge of the primitive) for a particular pixel is obtained by combining in hardware logic (e.g. using an AND gate), corresponding results for the pixel for each individual edge. Using the hardware described here, the coverage test may be performed precisely or the pixel corners used may be offset from the actual pixel corner in order to include an uncertainty region in the conservative rasterization.

Figure 2A:
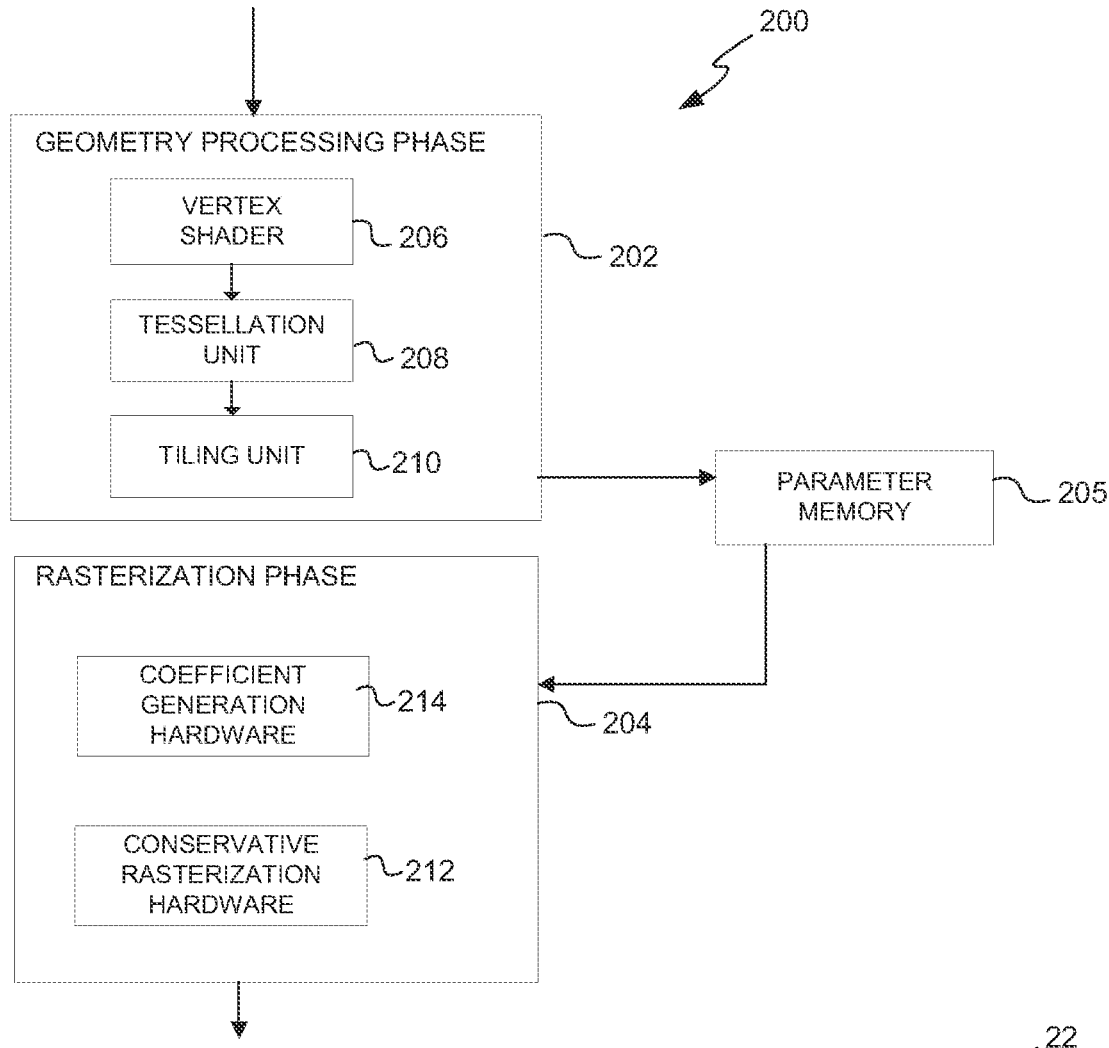
FIG. 2A is a schematic diagram of an example graphics processing unit (GPU) pipeline.

FIG. 2A shows a schematic diagram of an example graphics processing unit (GPU) pipeline 200 which may be implemented in hardware within a GPU and which uses a tile-based rendering approach. The hardware described herein may also be used in a GPU that instead uses alternative rendering approaches where the rendering processes groups of pixels (e.g. where immediate mode rendering is used). As shown in FIG. 2, the pipeline 200 comprises a geometry processing phase 202 and a rasterization phase 204. Data generated by the geometry processing phase 202 may pass directly to the rasterization phase 204 and/or some of the data may be written to memory (e.g. parameter memory 205) by the geometry processing phase 202 and then read from memory by the rasterization phase 204.

The geometry processing phase 202 comprises a vertex shader 206, tessellation unit 208 and tiling unit 210. Between the vertex shader 206 and the tessellation unit (or tessellator) 208 there may be one or more optional hull shaders, not shown in FIG. 2. The geometry processing phase 202 may also comprise other elements not shown in FIG. 2, such as a memory and/or other elements.

The vertex shader 206 is responsible for performing per-vertex calculations. Unlike the vertex shader, the hardware tessellation unit 208 (and any optional hull Shaders) operates per-patch and not per-vertex. The tessellation unit 208 outputs primitives and in systems which use vertex indexing, an output primitive takes the form of three vertex indices and a buffer of vertex data (e.g. for each vertex, a UV coordinate and in various examples, other parameters such as a displacement factor and optionally parent UV coordinates). Where indexing is not used, an output primitive takes the form of three domain vertices, where a domain vertex may comprise only a UV coordinate or may comprise a UV coordinate plus other parameters (e.g. a displacement factor and optionally, parent UV coordinates).

The tiling unit 210 generates per-tile display lists and outputs these, for example to the parameter memory 205. Each per-tile display list identifies, for a particular tile, those primitives which are at least partially located within that tile. These display lists may be generated by the tiling unit 210 using a tiling algorithm. Subsequent elements within the GPU pipeline 200, such as the rasterization phase 204, can then read the data from parameter memory 205.

The rasterization phase 204 renders some or all of the primitives generated by the geometry processing phase 202. The rasterization phase 204 comprises the conservative rasterization hardware 212, a coefficient generation hardware block 214 and may comprise other elements not shown in FIG. 2. The coarse microtile mask and coefficient generation hardware block 214 generates the coefficients that are used in the conservative rasterization hardware 212 (e.g. A, B, and C, as defined below).

The conservative rasterization hardware 212 in the rasterization phase 204 determines, for each pixel and for each of a plurality of primitives (e.g. each primitive on a per-tile display list), whether the pixel (i.e. the square pixel area, rather than a single sample position within the pixel) is partially or fully overlapped by the primitive. This is referred to as outer and inner coverage respectively. The rasterization hardware 212 is shown in more detail in FIGS. 3A and 3B and its operation can be described with reference to the flow diagram in FIG. 4.

As described above and shown in FIG. 2B, each primitive 21, 22, 23 has a plurality of edges (e.g. three edges for a triangular primitive 21). Each edge is defined by an edge equation which is a vector of the form:

$$f(x,y)=Ax+By+C$$

where A, B and C are constant coefficients specific to the polygon edge (and hence may be pre-calculated) and C has been pre-adjusted such that the scene origin is translated to the tile origin. The conservative rasterization hardware 212 determines for each edge of a primitive and for each pixel corner 120, 122 in a microtile 104, whether the pixel corner (having coordinates x,y) lies to the left or right or on the edge by calculating the value, or the sign, of $f(x,y)$ for the edge. The calculation is a sum-of-products (SOP).

Figure 3A:
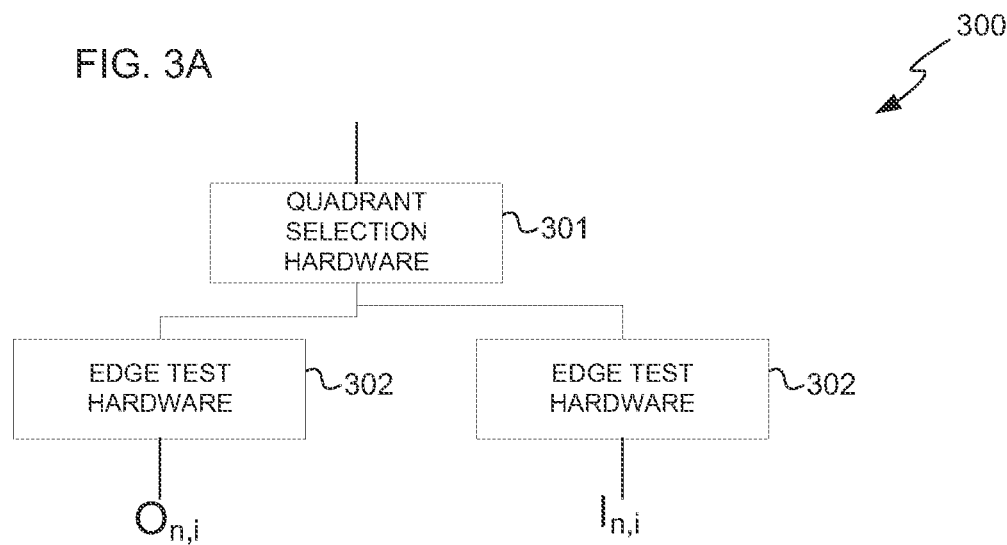
FIG. 3A is a schematic diagram showing a first part of the conservative rasterization hardware from the pipeline of FIG. 2A in more detail.
Figure 4:
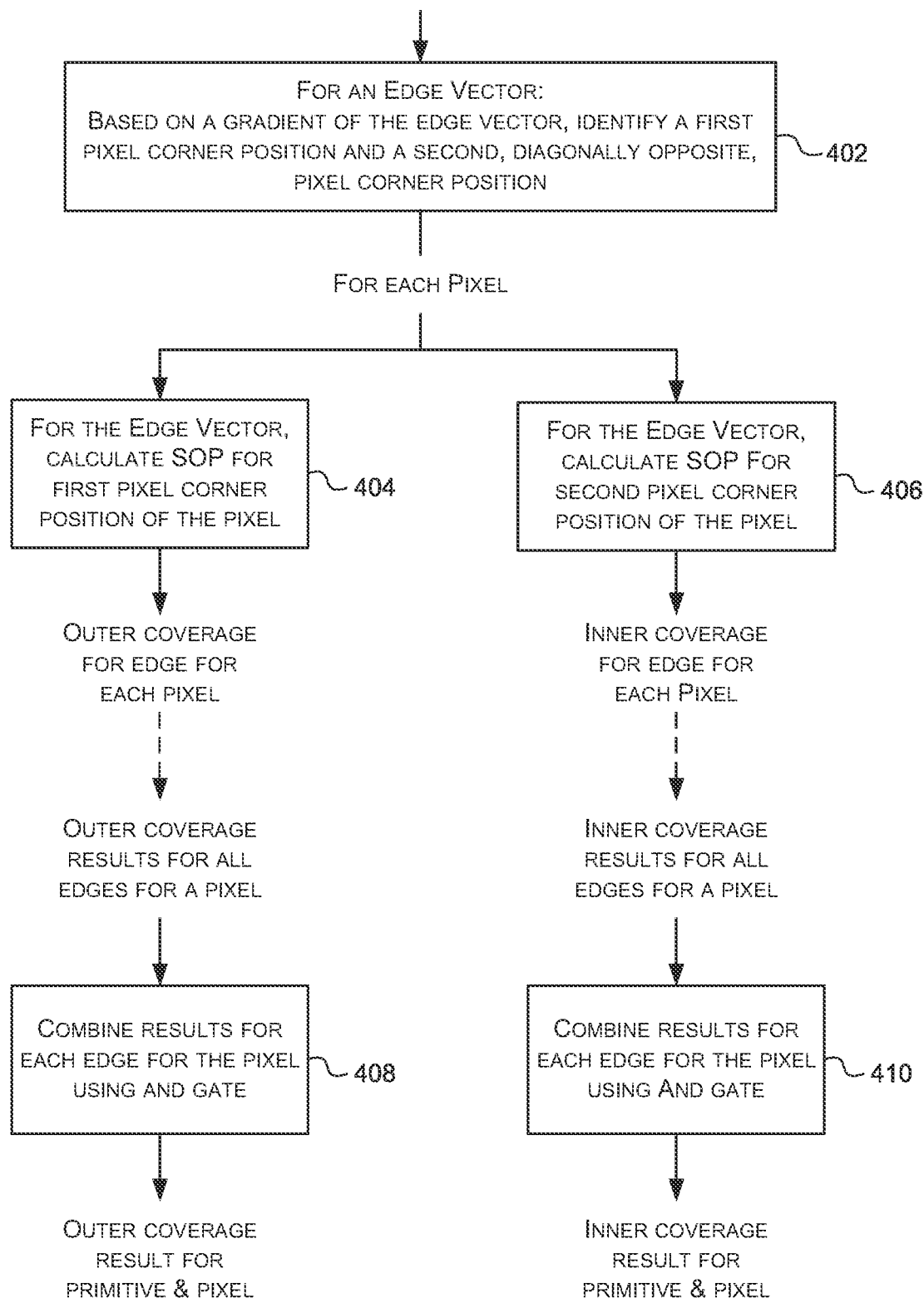
FIG. 4 is a flow diagram of an example method of performing conservative rasterization.
Figure 5A:
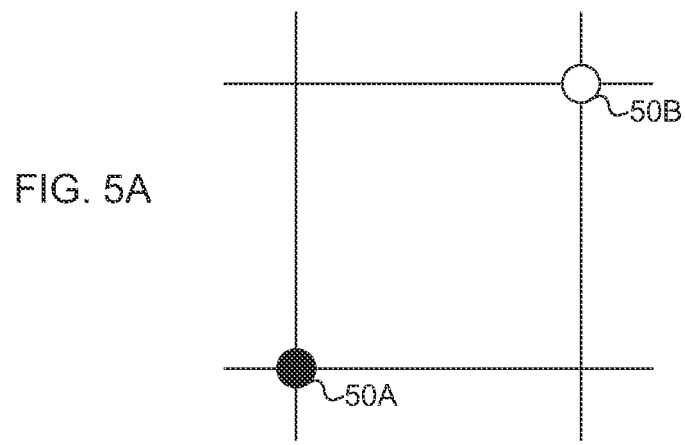
FIGS. 5A-5C are schematic diagrams illustrating selection of pixel corner positions.
Figure 5B:
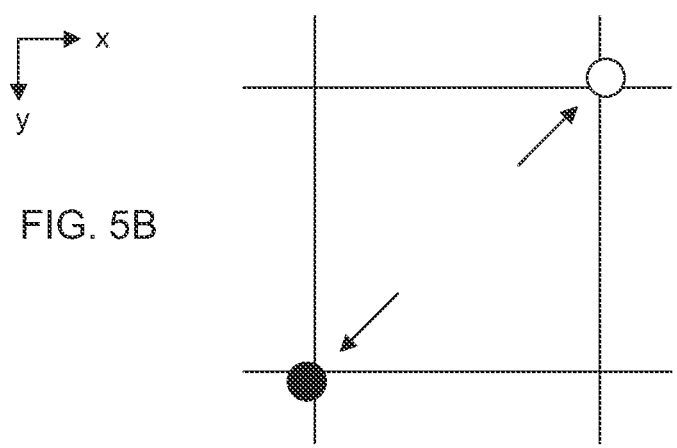

FIG. 3A shows a part of the conservative rasterization hardware 212 that relates to a single pixel. The quadrant selection hardware 301 determines the two pixel corner positions that will be used by the subsequent edge test hardware 302 (block 402). The two pixel corner positions are selected from the possible four pixel corners based on the gradient of the edge vector, e.g. pixel corners 50A, 50B as shown in FIG. 5A. The two pixel corners that are selected are always diagonally opposite each other. Where conservative rasterization is performed precisely, the selected positions correspond exactly to the pixel corners, as shown in FIG. 5A; however, where an uncertainty region is to be included, the pixel corner positions are offset from the pixel corners as shown in FIG. 5B, with the offset (as indicated by the arrows in FIG. 5B) being in a direction away from the centre of the pixel by a pre-defined amount (e.g. offset by 1/512 in both x and y directions).

Figure 5C:
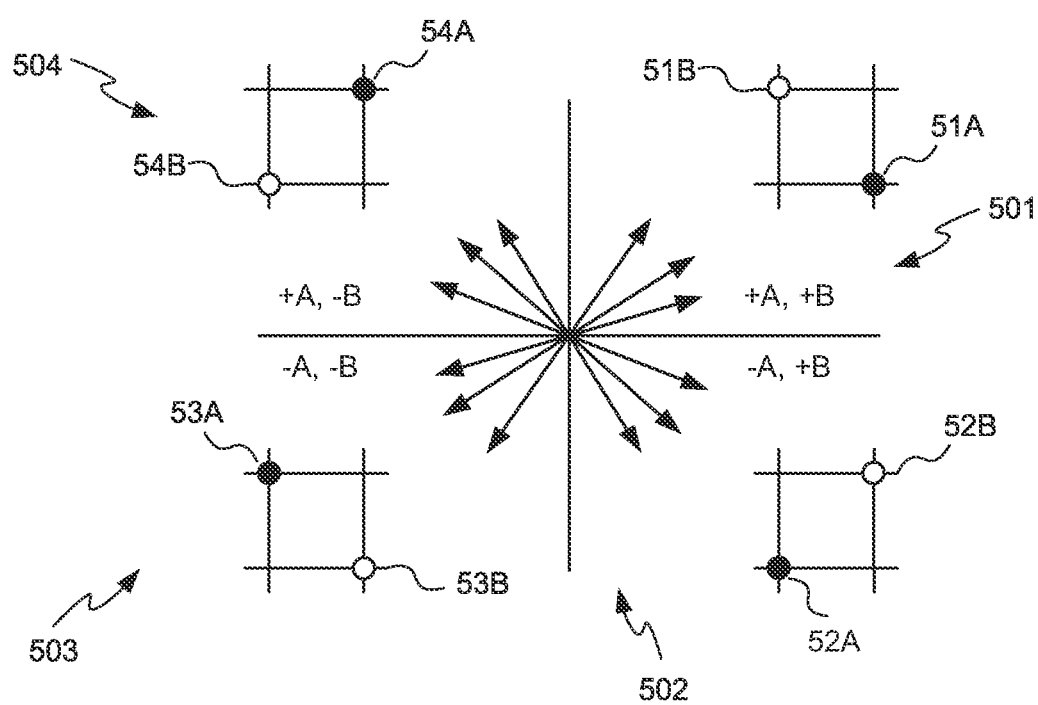

The selection of pixel corner positions based on the gradient (in block 402) can be described with reference to FIG. 5C. FIG. 5C is a schematic diagram showing the possible gradients of the edge being divided into four quadrants 501-504. If the gradient of the edge is in the first quadrant 501 (i.e. coefficients A and B in the edge vector are both positive), then the bottom right and top left pixel corners, 51A, 51B are selected. If the gradient of the edge is in the second quadrant 502 (i.e. coefficient A in the edge vector is negative and coefficient B is positive) then the bottom left and top right pixel corners 52A, 52B are selected. If the gradient of the edge is in the third quadrant 503 (i.e. coefficients A and B in the edge vector are both negative), then the top left and bottom right pixel corners 53A, 53B are selected. If the gradient of the edge is in the fourth quadrant 504 (i.e. coefficient A in the edge vector is positive and coefficient B is negative), then the top right and bottom left pixel corners 54A, 54B is selected. Of these pixel corners that are selected, the first (labelled A and shown as a black circle) is subsequently used to calculate the outer coverage result and the second (labelled B and shown as a white circle) is subsequently used to calculate the inner coverage result. This description of FIG. 5C assumes use of a clockwise winding order of the primitive. This is a design choice and the method may be modified appropriately if an anti-clockwise order is used. The modification will depend upon the method chosen for creating the coefficients and may, for example, involve rotating the selection of sample points by 180 degrees and/or inverting the sign of the edge test.

Figure 9:
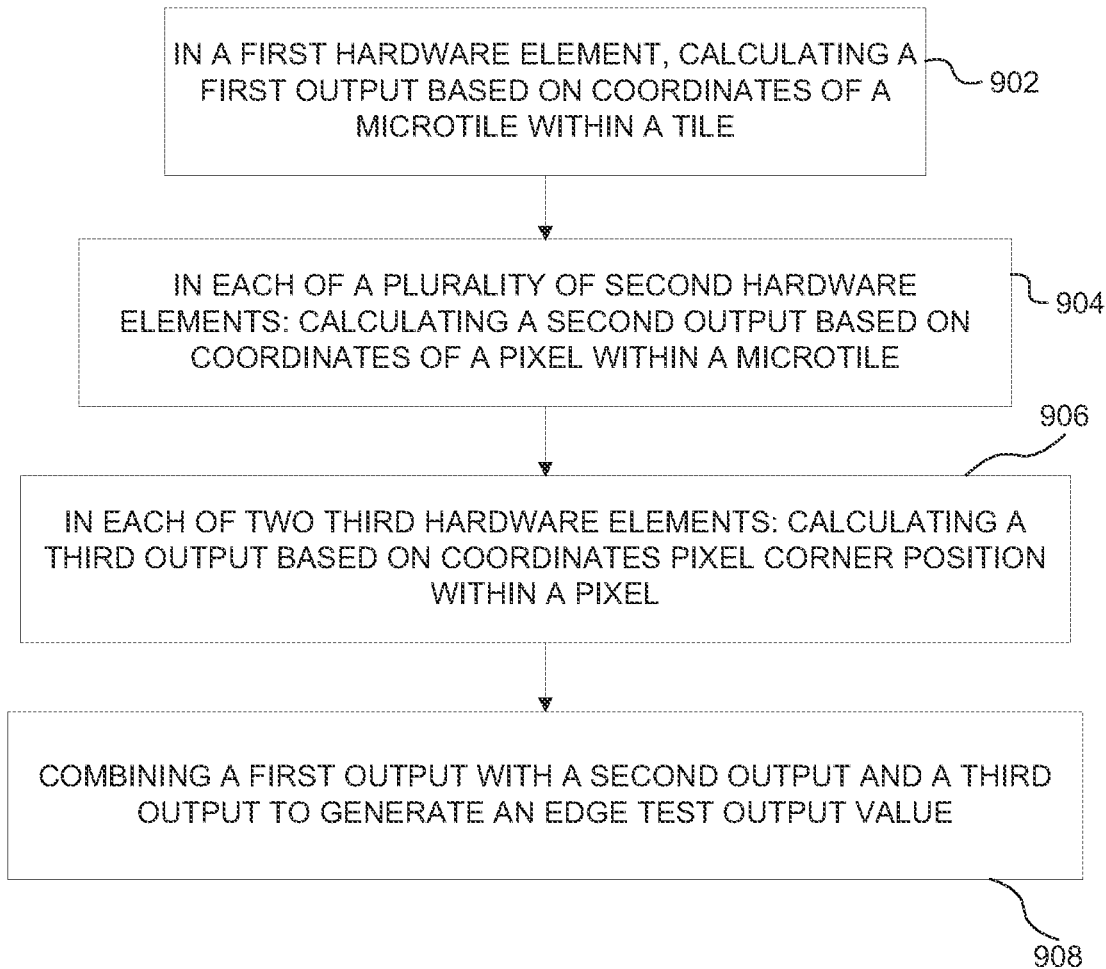
FIG. 9 is a flow diagram of an example method of performing edge detection.

Having determined the two pixel corner positions (in the quadrant selection hardware 301), the edge test hardware 302 calculates, for each of the two selected pixel corner positions, whether the pixel corner lies on the edge or to the left or right of the edge by calculating the value, or the sign, of f(x,y) for the edge (blocks 404, 406). This is because:

If f(x,y) is calculated to be positive (i.e. greater than zero), then the pixel corner is to the right of the edge If f(x,y) is calculated to be negative (i.e. less than zero), then the pixel corner is to the left of the edge If f(x,y) is calculated to be exactly zero, then the pixel corner is precisely on the edge Whilst FIG. 3A only shows 2 discrete edge test hardware elements 302, it will be appreciated that there may be many more of these and in various examples the edge test hardware elements 302 may be combined into edge test hardware logic arranged to calculate multiple edge test results in parallel, e.g. to calculate the edge test results for each of the pixel corner positions in a microtile 104 in parallel. By combining the edge test hardware logic, efficiencies may be achieved as hardware and/or intermediate results may be reused, i.e. used in the calculation of more than one edge test result. An example of such combined hardware is described in co-pending UK application no. 1805608.5 and this is also shown in FIGS. 8A, 8B and 9 and described below.

The sign (or value) of f(x,y) for the two pixel corner positions for a pixel (as calculated in hardware elements 302 and blocks 404, 406) are the result for the first pixel corner position is the outer coverage result, $O_{n,i}$, for the pixel i and edge n, and the result for the second pixel corner position is the inner coverage result, $I_{n,i}$, for the pixel i and edge n.

Figure 3B:
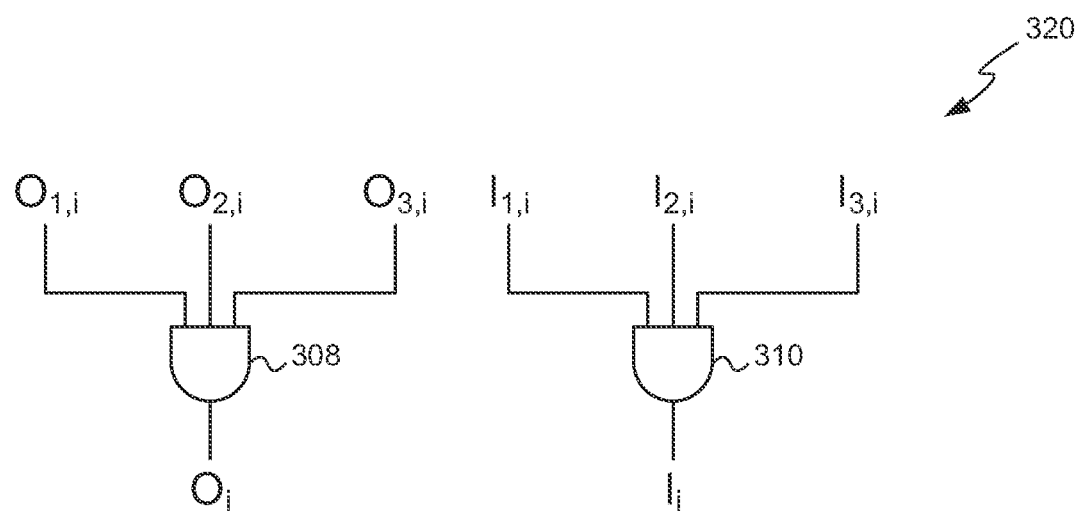
FIG. 3B is a schematic diagram showing a second part of the conservative rasterization hardware from the pipeline of FIG. 2A in more detail.

Having calculated outer coverage results, $O_{n,i}$, for a pixel i and each edge n, the results for the different edges are combined using an AND gate 308 (block 408) as shown in FIG. 3B. This generates a single outer coverage result $O_i$ for the pixel i and if it is negative it indicates that the primitive does not intersect any part of the square pixel area. Conservative rasterization does not permit false negatives for outer coverage results, although a small number of false positives for outer coverage results are permitted. Using the methods and hardware described herein, the number of false positive results for inner coverage is reduced (there are no inherent false positives for inner coverage).

Having calculated inner coverage results, $I_{n,i}$, for a pixel i and each edge n, the results for the different edges are combined using an AND gate 310 (block 410) as shown in FIG. 3B. This generates a single inner coverage result $I_i$ for the pixel i and if it is negative it indicates that the primitive does not fully cover the square pixel area.

Whilst FIG. 3B and the description above refers to use of AND gates 308, 310, it will be appreciated that these (and any other AND gates referred to herein) may alternatively replaced by any logic block configured to perform an AND operation and such a logic block may be referred to as an AND logic block.

As noted above, the outer coverage results obtained using the methods described above includes a number of false positives. The false positives may be removed by applying a bounding box and excluding from the outer coverage positive results, any pixels that are outside the bounding box. The bounding box is generated such that it contains the primitive and may, for example, be computed such that the vertex coordinates of the bounding box are given by the maximum and minimum x and y values of the vertices of the primitive (i.e. top left vertex=(min x, max y,), top right vertex=(max x, max y), bottom right vertex=(max x, min y), bottom left vertex=(min x, min y)). The application of the bounding box may, for example, be implemented by calculating (e.g. in advance) a mask corresponding to the bounding box for a primitive, with all those pixels which are inside the bounding box having a mask bit of one and all those pixels which are outside the bounding box having a mask bit of zero. An AND logic block can then be used to combine the single outer coverage result $O_i$ for the pixel i and the mask bit for the pixel i to generate the final outer coverage result $O_i'$ for the pixel i. The final outer coverage results for the pixels have fewer false positives than if the bounding box was not applied.

FIGS. 8A and 8B show two different example implementations of the edge test hardware 302 shown in FIG. 3A. As described above, the implementations shown in FIGS. 8A and 8B may correspond to multiple edge test hardware elements 302 and this results in a more efficient hardware implementation (e.g. in terms of physical size and power consumption).

The first example hardware arrangement 800, shown in FIG. 8A, comprises a single microtile component hardware element 802, a plurality (e.g. one for each pixel, so 16 for the example shown in FIG. 1) of pixel component hardware elements 804, two subsample component hardware elements 806 and a plurality (e.g. two for each pixel, so 32 for the example shown in FIG. 1) of addition and comparison elements (which may, for example, be implemented as a plurality of adders) 808, with each addition and comparison element 808 generating an output result for a different pixel corner position within the same microtile (and hence a pair of addition and comparison elements 808 generate the two output results for a single pixel). The hardware arrangement 800 may additionally comprise a plurality of multiplexers 810 that connect the microtile component hardware element (s) 802, pixel component hardware elements 804 and subsample component elements 806 to the addition and comparison elements 808. In examples that include multiplexers 810, one or more select signals (which may also be referred to as 'mode signals' and may comprise a one-hot signal that encodes a particular mode of operation of the hardware) control the operation of the multiplexers 810 and in particular control which combination of the hardware elements 802, 804, 806 are connected to each particular addition and comparison element 808 (e.g. for each addition and comparison element 808, which one of the plurality pixel component hardware elements 804 and which one of the subsample component hardware elements 806, where there is more than one, are connected to the addition and comparison element 808, with each addition and comparison element 808 also being connected to the single microtile component hardware element 802).

If, as described above, the edge test hardware 302 evaluates a SOP of the form:

$$f(x,y)=Ax+By+C$$

where the values of the coefficients A, B, C may be different for each SOP evaluated, then the microtile component hardware element 802 evaluates:

$$f_{UT}(x_{UT},y_{UT})=Ax_{UT}+By_{UT}+C$$

where the values of $x_{UT}$ and $y_{UT}$ (the microtile coordinates relative to the tile origin 110), differ for different microtiles. The microtile component hardware element 802 may receive, as inputs, the values of A, B, C, $x_{UT}$ and $y_{UT}$ and the element outputs a single result $f_{UT}$.

The pixel component hardware elements 804 evaluate:

$$f_P(x_P,y_P)=Ax_P+By_P$$

for different values of $x_P$ and $y_P$ (where these values differ for different pixels within a microtile). The set of values of $x_P$ and $y_P$ (i.e. the values of $x_P$ and $y_P$ for all pixels within a microtile, as defined relative to the microtile origin) is the same for all microtiles and they may, for example, be calculated by the edge test hardware 302 or may be accessed from a look-up table (LUT). In various examples, the origin of a microtile may be defined as the top left corner of each microtile and the values of $x_P$ and $y_P$ may be integers and so the determination of the values requires little or no computation (and hence this provides an efficient implementation). Referring back to the example shown in FIG. 1, where each microtile comprises four rows of four pixels, then the set of values of $x_P$ is {0, 1, 2, 3} (which may also be written as [0,3]) and the set values of $y_P$ is {0, 1, 2, 3} (which may also be written [0,3]). Each pixel component hardware element 804 receives as input A and B and may also receive the set of values of $x_P$ and $y_P$ (e.g. in examples where these are not integers). Each element 804 outputs a single result $f_P$ and consequently the calculation of $f_P$ may be merged with any calculations that are performed to determine $x_P$ and/or $y_P$.

The subsample component hardware elements 806 evaluate:

$$f_S(x_S,y_S)=Ax_S+By_S$$

for different values of $x_S$ and $y_S$, where these values differ for the two different pixel corner positions (e.g. as shown in FIGS. 5A-5C and described above). The set of values of $x_S$ and $y_S$ (i.e. the values of $x_S$ and $y_S$ for the two selected pixel corner positions, as defined relative to the pixel origin) are the same for all pixels within a microtile and they are determined within the quadrant selection hardware 301 and the values themselves may be input to the subsample component hardware elements 806 or an identifier for the pixel corner positions may be input and the actually values may be calculated or determined (e.g. accessed from a look-up table (LUT)), by the element 806 or shared hardware logic. Each subsample component hardware element 806 receives as input A and B. Each element 806 outputs a single result $f_S$ and consequently the calculation of $f_S$ may be merged with any calculations that are performed to determine $x_S$ and/or $y_S$.

The addition and comparison elements 808 evaluate:

$$f(x,y)=f_{UT}+f_P+f_S$$

and each addition and comparison element 808 sums a different combination of $f_{UT}$, $f_P$, and $f_S$ values (where the particular combination of values are provided as inputs to the addition and comparison unit 808) and the combination is either fixed (i.e. hardwired between the elements) or is selected by one or more multiplexers 810 (where provided). To perform an edge test only the MSB (or sign-bit) of the result (i.e. of f(x,y)) is output and hence the full result does not need to be calculated by the addition and comparison element 508 and the addition and comparison element 508 may perform a comparison rather than an addition (which reduces the overall area of the hardware). This MSB indicates the sign of the result (because a>b≡≡sign (b−a)) and, as described above, this indicates whether the pixel corner position is to the left or right of the edge.

The second example hardware arrangement 820, shown in FIG. 8B, is a variation on the hardware arrangement 800 shown in FIG. 8A. This second example hardware arrangement 820 comprises a single microtile component hardware element 802, a plurality (e.g. 16) of pixel component hardware elements 824 (although these operate slightly differently to those shown in FIG. 8A and described above), two subsample component hardware elements 806 and a plurality (e.g. two for each pixel, so 32 for the example shown in FIG. 1) of addition and comparison elements (which may, for example, be implemented as a plurality of adders) 828 (although these operate slightly differently to those shown in FIG. 8A and described above), with each addition and comparison element 828 generating an output result. Like the hardware arrangement 800 shown in FIG. 8A, the hardware arrangement 820 shown in FIG. 8B may additionally comprise a plurality of multiplexers 810 controlled by select signals.

If, as described above, the edge test hardware 302 evaluates a SOP of the form:

$$f(x,y)=Ax+By+C$$

where the values of the coefficients A, B, C may be different for each SOP evaluated, then the microtile component hardware element 802 operates as described above with reference to FIG. 8A; however, instead of the output being fed directly into the addition unit 828 (as shown in FIG. 8A), in the arrangement 820 of FIG. 8B, the output of the microtile component hardware element 802 is input to each of the plurality of pixel component hardware elements 824. Each of the one or more subsample component hardware elements 806 also operate as described above with reference to FIG. 8A.

The pixel component hardware elements 824 in the arrangement 820 of FIG. 8B do not operate in the same way as those shown in FIG. 8A. They receive as input (in addition to A and B) the output from the microtile component hardware element 802, $f_{UT}$, and evaluate:

$$f_{UT}(x_{UT},y_{UT})+f(x_P,y_P)=f_{UT}(x_{UT},y_{UT})+Ax_P+By_P$$

for different values of $x_P$ and $y_P$ (where these values differ for different pixels within a microtile). As described above (with reference to FIG. 8A) the values of $x_P$ and $y_P$ (i.e. the values of $x_P$ and $y_P$ for all pixels within a microtile, as defined relative to the microtile origin) may be integers and hence the pixel component hardware elements 824 may comprise an arrangement of adders to add the appropriate multiples of A and/or B to the input value generated by the microtile component hardware element, $f_{UT}$, 802 and this may be implemented without using any multipliers and this reduces the size and/or power consumption of the addition and comparison unit 828. Each element 824 outputs a single result $f_{UT}+f_P$ and as described above, the calculation of $f_P$ and hence the calculation of the single result may be merged with any calculations that are performed to determine $x_P$ and/or $y_P$.

The addition and comparison elements 828 evaluate:

$$f(x,y)=f_{UT}+f_P+f_S$$

in a similar manner to the addition and comparison elements 808 described above; however the inputs are different since the values of $f_{UT}$ and $f_P$ have already been combined in the pixel component hardware elements 824. Each addition and comparison element 428 sums a different combination of $(f_{UT}+f_P)$ and $f_S$ values (where the particular combinations of values are provided as inputs to the addition and comparison units 828) and the combination is either fixed (i.e. hardwired) or is selected by one or more multiplexers 810 (where provided). As described above, in various examples, only the MSB (or sign-bit) of the result (i.e. of f(x,y)) is output and hence the full result does not need to be calculated. This MSB indicates the sign of the result and, as described above, this indicates whether the pixel corner position is to the left or right of the edge.

The hardware arrangement 820 shown in FIG. 8B may utilize the fact that the value of $f_P$ can be calculated quickly or alternatively the UTC calculation may be performed in the previous pipeline stage. By using this arrangement 820 the overall area of the hardware arrangement 820 may be reduced compared to the arrangement 802 shown in FIG. 8A (e.g. the addition and comparison elements 828 may be smaller than addition and comparison elements 808); however, each of the results output by the pixel component hardware elements 824 comprises more bits (e.g. approximately 15 more bits) than in the arrangement 800 shown in FIG. 8A.

Although FIG. 8B shows the microtile component hardware element 802 aligned with the subsample component hardware element 806, these calculations may not be performed in parallel. In various examples, a first pipeline stage in the hardware arrangement may calculate the microtile component $f_{UT}$ (in the microtile component hardware element 802) and in parallel perform the look-up of the subsample positions (e.g. from a LUT, as described above). This maximises the time available for the computations in the second pipeline stage in which the pixel component hardware element 824 adds the pixel components $f_P$ to the microtile component $f_{UT}$ and in parallel the subsample component hardware element 806 calculates the subsample (or pixel corner position) components $f_S$.

Although FIGS. 8A and 8B show the hardware elements 802, 804, 806, 824 being connected to a single addition and comparison element 808, 828 (optionally via multiplexers 810), this is to reduce the complexity of the diagram only. As described above, each addition and comparison element 808, 828 generates an output result and the hardware arrangement 800, 820 is, in all examples, arranged to calculate a plurality of results (e.g. 32 results) in parallel and hence comprises a plurality of addition and comparison elements 808, 828 (e.g. 32 addition and comparison elements).

Although FIGS. 8A and 8B both show only a single microtile component element 802, such that all the results generated in parallel by the hardware arrangement 800, 820 relate to pixel corner positions within the same microtile, in other examples the hardware arrangement may comprise a plurality of microtile component elements 802 and in such examples, the results generated in parallel by the hardware arrangement may relate to pixel corner positions within more than one microtile.

In various examples, the hardware arrangement 800, 820 may further comprise a plurality of fast decision units 830 (which may also be referred to as fast fail/pass logic elements), one for each microtile and the condition is then applied to all outputs (e.g. the outputs from all of the plurality of addition and comparison elements 808, 828). The fast decision unit 830 receives the output generated by the microtile component hardware element 802 and determines whether, based on the output received, any possible contributions from a pair comprising a pixel component hardware element 804, 824 and a subsample component element 806 could change the value of the MSB of the value output by the microtile component hardware element 802.

If the value output by the microtile component hardware element 802, $f_{UT}$, is sufficiently positive that no pixel or subsample contribution could make the resultant f(x,y) negative (after taking into consideration any edge rule adjustment), i.e. if:

$$f_{UT} > |f_{Pmin}| + |f_{Smin}|$$

where $f_{Pmin}$ is the minimum, i.e. most negative, possible value of $f_P$ and $f_{Smin}$ is the minimum, i.e. most negative, possible value of $f_S$, then the hardware arrangement 800, 820 can determine whether the edge test passes or fails without evaluating the outputs generated by the pixel component hardware elements 804, 824 and the subsample component elements 806 (i.e. without completely evaluating the final sum).

Similarly, if the value output by the microtile component hardware element 802, $f_{UT}$, is sufficiently negative that no pixel or subsample contribution could make the resultant f(x,y) positive or zero, i.e. if:

$$|f_{UT}| > f_{Pmax} + f_{Smax}$$

where $f_{Pmax}$ is the maximum, i.e. most positive, possible value of $f_P$ and $f_{Smax}$ is the maximum, i.e. most positive, possible value of $f_S$, then the hardware arrangement 800, 820 can determine whether the edge test passes or fails without evaluating the outputs generated by the pixel component hardware elements 804, 824 and the subsample component elements 806 (i.e. without completely evaluating the final sum).

The implementation of the fast decision unit 830 reduces the width of the addition that is performed by each addition and comparison element 808, 828 as a number of (e.g. three) MSBs from the output generated by the microtile component hardware element 802 can be omitted from the addition. The precise number of MSBs that can be omitted is determined by the number of microtiles in a tile (i.e. how many $X_{UT}$ bits there are) and the precise constrains on coefficient C.

As described above the hardware arrangements 800, 820 are both suitable for use in GPUs which use any rendering approach in which groups of pixels are processed together and this includes both tile-based rendering and immediate-mode rendering. In various examples, the hardware 820 as shown in FIG. 8B with the inclusion of a fast decision unit 830 may be particularly suited to GPUs which use immediate-mode rendering. This is because immediate-mode rendering results in a larger UTC element 802 than for tile-based rendering (because the range of coordinates may now cover the entire screen area).

The selection of which hardware arrangement 800, 820 to use in any implementation will be dependent upon various factors, including but not limited to the rendering approach used by the GPU. The hardware arrangement 800 shown in FIG. 8A has less delay and fewer registers before the multiplexers 810 for the PPC elements 804, compared to the arrangement in the hardware 820 shown in FIG. 8B; however, the addition and comparison element 808 in FIG. 8A is larger and uses more power than the addition and comparison unit 828 in FIG. 58. Consequently, where there are a large number of addition and comparison elements 808 (e.g. 64 or more), then use of the hardware arrangement 820 shown in FIG. 8B may be more suitable. However, in the hardware arrangement 820 shown in FIG. 8B it is not possible to gate out the PPC elements 824 if only the microtile index changes, but for 64 or more outputs, the reduced complexity of the addition and comparison unit 828 may provide a dominant effect with respect to power consumption of the hardware.

FIG. 9 is a flow diagram of an example method of performing edge detection in an efficient manner (i.e. in terms of size of hardware and power consumption) for a rendering space divided into tiles and wherein each tile is subdivided into a plurality of microtiles, each microtile comprising an identical arrangement of pixels. This method uses the hardware described above and shown in FIGS. 8A and 8B and may be part of a method of rendering in a graphics processing pipeline.

The method comprises, in a first hardware element 802, calculating a first output based on coordinates of a microtile (block 902). The method further comprises, in each of a plurality of second hardware elements 804, 824, calculating one of a plurality of second outputs based on coordinates of one of a plurality of pixels within the microtile, (block 904) wherein each of the plurality of second hardware elements and each of the plurality of second outputs relates to a different one of the plurality of pixels. The method further comprises, in each of two third hardware elements 806, calculating a third output based on coordinates of a pixel corner position (block 906), where each of the plurality of third hardware elements and each of the plurality of third outputs (generated by different ones of the plurality of third hardware elements) relates to a different one of pair of pixel corner positions. The method further comprises generating a plurality of output values by combining the first output with different combinations of one of the second outputs and a third output using one or more addition units (block 908), wherein each output value is an edge test output.

Figure 2B:
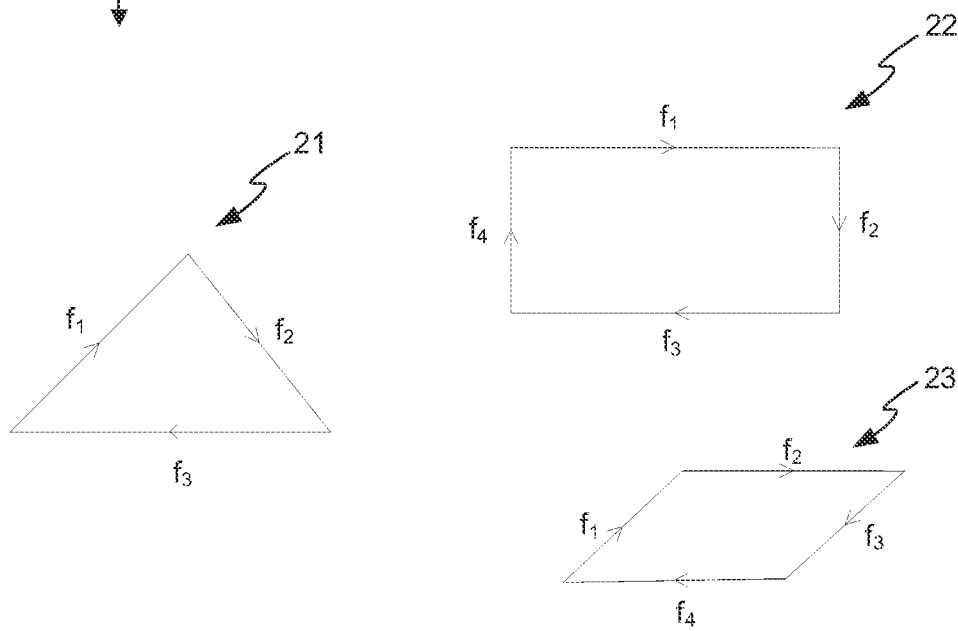
FIG. 2B is a schematic diagram showing the edge vectors for various primitives.

In the description above, it is assumed that each edge is assessed independently (and so there may be an instance of edge test hardware 302 for each edge of the primitive); however, where there is a predefined relationship between the edge vectors for two or more edges, then some of the outputs calculated may be re-used when performing the edge test for each of those edges and this further reduces the area of the overall hardware. For example, if the primitive is a rectangle 22 or parallelogram 23, as shown in FIG. 2B, there is a predefined relationship between the coefficients in the opposing pairs of edge vectors, i.e. $f_1$ and $f_3$, $f_2$ and $f_4$. In particular, if:

$$f_1(x,y)=Ax+By+C_1$$

Then:

$$f_3(x,y)=-Ax-By+C_3$$

Consequently, it is not necessary to duplicate all the pixel component hardware elements 804 and subsample component hardware elements 806 for the negated coefficients and instead the outputs from the pixel component hardware elements 804 for the first edge can be reused for the second edge and the outputs from the subsample component hardware elements 806 for the first edge can be reused for the second edge.

This may, for example be implemented, as follows: where the hardware arrangement 800 of FIG. 8A is used, the outputs from the pixel component hardware elements 804:

$$f_P(x_P,y_P)=Ax_P By_P$$

for the first edge, $f_t$, may be inverted and reused for the second edge where:

$$f_P(x_P,y_P)=-Ax_P-By_P$$

Similarly, the outputs from the subsample component hardware elements 806:

$$f_S(x_S,y_S)=-Ax_S-By_S$$

for the first edge, $f_t$, may be inverted and reused for the second edge where:

$$f_S(x_S,y_S)=-Ax_S-By_S$$

Or alternatively, the negations of the outputs from the pixel component hardware elements 804 and subsample component hardware elements 806 can be omitted and instead the comparison performed in the addition and comparison unit 808 may be modified, such that for the first edge the comparison is:

$$f_{UT1}+f_P+f_S>0$$

And for the second edge, the modified comparison is:

$$f_{UT2}+f_P+f_S\leq 0$$

(where $f_{UT2}$ is calculated with the C coefficient negated) and this may result in a more efficient hardware implementation (e.g. in terms of size and/or power).

This reuse of all the outputs from various hardware elements 804, 806 for more than one edge results, as described above, in an overall area saving. For example, the area of hardware for performing edge testing for a pair of opposing edges may be less than 1.5 times the area of the hardware for performing edge testing for a single edge. Consequently the overall hardware size for performing conservative rasterization is also reduced.

In the methods described above, all edges of a primitive are treated in the same way; however, if a pixel is exactly on the edge of an object, an edge rule may be applied so that the pixel is determined to be within (and hence made visible) on only one of the primitives. In various examples, the edge rule may determine that a pixel that lies on the top or left edge lies within the primitive, whereas if the pixel lies on another edge, it is considered to be outside the primitive. These edges may be defined in terms of their A and B coefficients and an example is shown for a triangular primitive in the table below:

| | TYPE | A | B | Sample on the edge will be considered to be: |
|---|---|---|---|---|
| when $f(x, y) = 0$ | Left edge | >0 | (any value) | Inside |
| | Right edge | <0 | (any value) | Outside |
| | Horizontal top edge | =0 | >0 | Inside |
| | Horizontal bottom edge | =0 | <0 | Outside |

The edge rule may, for example, be implemented by subtracting one LSB (least significant bit) in the final summations (e.g. as performed in blocks 808, 828) for right or horizontal bottom edges and this LSB may be subtracted by subtracting one LSB to the output from the microtile component hardware element 802. This results in an efficient hardware implementation as it avoids any need for the comparison elements to identify situations where f(x,y) is equal to zero but instead the comparison elements only need to determine the sign of f(x,y) and hence whether f(x,y)≥0.

Using the hardware arrangement and method described above to determine the outer and inner coverage for each pixel in a microtile results in a hardware logic implementation of conservative rasterization that has good utilization (e.g. because it only requires a few additional SOPs to be calculated and because the computation is performed in parallel for all of the pixels in a microtile, and, in various examples, existing hardware in the rasterization phase 204 can be reused), and is both compact (in terms of physical size) and power efficient (e.g. because the computation is performed in parallel for all of the pixels in a microtile).

Figure 6:
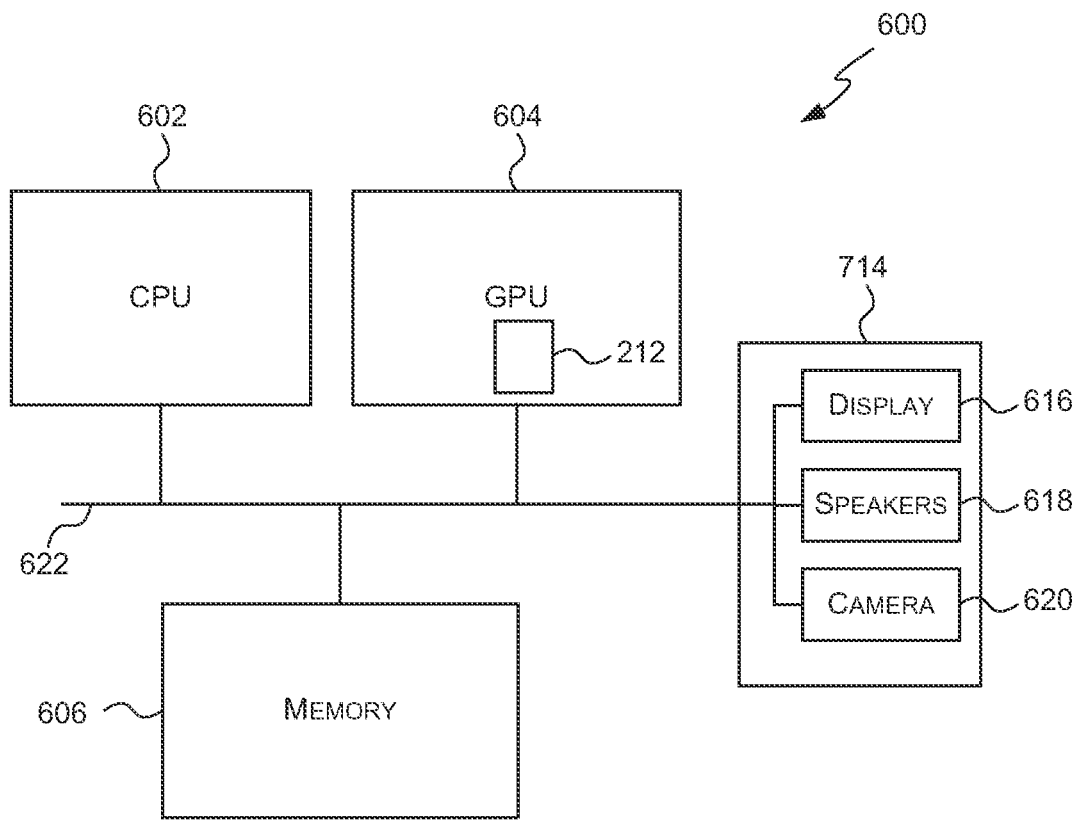
FIG. 6 shows a computer system in which a graphics processing pipeline comprising the conservative rasterization hardware is implemented.

FIG. 6 shows a computer system in which the graphics processing systems described herein may be implemented. The computer system comprises a CPU 602, a GPU 604, a memory 606 and other devices 614, such as a display 616, speakers 618 and a camera 620. The graphics processing pipeline, described above, and in particular the conservative rasterization hardware 212 may be implemented within the GPU 604. The components of the computer system can communicate with each other via a communications bus 622.

The hardware arrangements shown in FIGS. 2, 3A and 3B and described above are shown as comprising a number of functional blocks. This is schematic only and is not intended to define a strict division between different logic elements of such entities. Each functional block may be provided in any suitable manner. It is to be understood that intermediate values described herein as being formed by any of the elements (e.g. any of the elements in FIGS. 3A and 3B) need not be physically generated by the hardware arrangement at any point and may merely represent logical values which conveniently describe the processing performed by the hardware (e.g. the graphics processing pipeline) between its input and output.

The conservative rasterization hardware 212 described herein may be embodied in hardware on an integrated circuit. The conservative rasterization hardware 212 described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), physics processing units (PPUs), radio processing units (RPUs), digital signal processors (DSPs), general purpose processors (e.g. a general purpose GPU), microprocessors, any processing unit which is designed to accelerate tasks outside of a CPU, etc. A computer or computer system may comprise one or more processors. Those skilled in the art will realize that such processing capabilities are incorporated into many different devices and therefore the term 'computer' includes set top boxes, media players, digital radios, PCs, servers, mobile telephones, personal digital assistants and many other devices.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture a graphics processing pipeline configured to perform any of the methods described herein, or to manufacture a graphics processing pipeline comprising conservative rasterization hardware described herein. An integrated circuit definition dataset may be, for example, an integrated circuit description.

Therefore, there may be provided a method of manufacturing, at an integrated circuit manufacturing system, a graphics processing pipeline comprising conservative rasterization hardware as described herein. Furthermore, there may be provided an integrated circuit definition dataset that, when processed in an integrated circuit manufacturing system, causes the method of manufacturing a graphics processing pipeline comprising conservative rasterization hardware to be performed.

An integrated circuit definition dataset may be in the form of computer code, for example as a netlist, code for configuring a programmable chip, as a hardware description language defining an integrated circuit at any level, including as register transfer level (RTL) code, as high-level circuit representations such as Verilog or VHDL, and as low-level circuit representations such as OASIS® and GDSII. Higher level representations which logically define an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a graphics processing pipeline will now be described with respect to FIG. 7.

Figure 7:
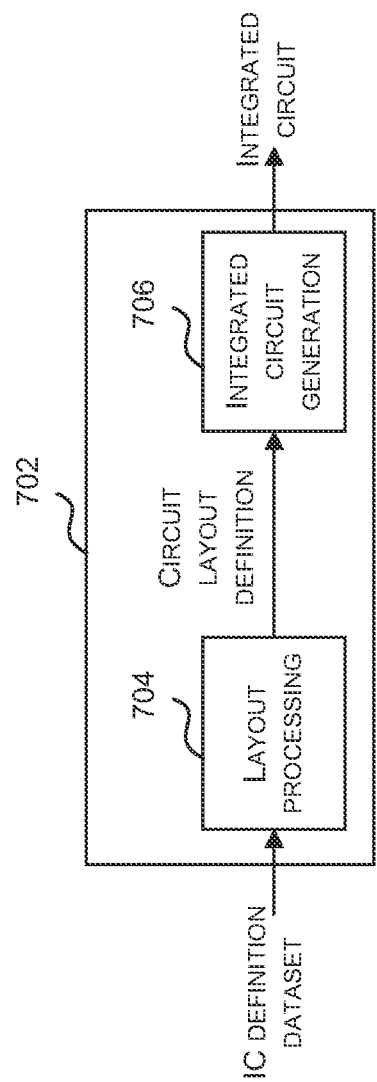
FIG. 7 shows an integrated circuit manufacturing system for generating an integrated circuit embodying a graphics processing pipeline comprising the conservative rasterization hardware described herein.

FIG. 7 shows an example of an integrated circuit (IC) manufacturing system 702 which is configured to manufacture a graphics processing pipeline comprising conservative rasterization hardware as described in any of the examples herein. In particular, the IC manufacturing system 802 comprises a layout processing system 704 and an integrated circuit generation system 706. The IC manufacturing system 702 is configured to receive an IC definition dataset (e.g. defining a graphics processing pipeline comprising conservative rasterization hardware as described in any of the examples herein), process the IC definition dataset, and generate an IC according to the IC definition dataset (e.g. which embodies a graphics processing pipeline comprising conservative rasterization hardware as described in any of the examples herein). The processing of the IC definition dataset configures the IC manufacturing system 702 to manufacture an integrated circuit embodying a graphics processing pipeline comprising conservative rasterization hardware as described in any of the examples herein.

The layout processing system 704 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 704 has determined the circuit layout it may output a circuit layout definition to the IC generation system 706. A circuit layout definition may be, for example, a circuit layout description.

The IC generation system 806 generates an IC according to the circuit layout definition, as is known in the art. For example, the IC generation system 706 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 806 may be in the form of computer-readable code which the IC generation system 806 can use to form a suitable mask for use in generating an IC.

The different processes performed by the IC manufacturing system 702 may be implemented all in one location, e.g. by one party. Alternatively, the IC manufacturing system 802 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a graphics processing pipeline comprising conservative rasterization hardware without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 7 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 7, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

The methods described herein may be performed by a computer configured with software in machine readable form stored on a tangible storage medium e.g. in the form of a computer program comprising computer readable program code for configuring a computer to perform the constituent portions of described methods or in the form of a computer program comprising computer program code means adapted to perform all the steps of any of the methods described herein when the program is run on a computer and where the computer program may be embodied on a computer readable storage medium. Examples of tangible (or non-transitory) storage media include disks, thumb drives, memory cards etc. and do not include propagated signals. The software can be suitable for execution on a parallel processor or a serial processor such that the method steps may be carried out in any suitable order, or simultaneously.

The hardware components described herein may be generated by a non-transitory computer readable storage medium having encoded thereon computer readable program code.

Memories storing machine executable data for use in implementing disclosed aspects can be non-transitory media. Non-transitory media can be volatile or non-volatile. Examples of volatile non-transitory media include semiconductor-based memory, such as SRAM or DRAM. Examples of technologies that can be used to implement non-volatile memory include optical and magnetic memory technologies, flash memory, phase change memory, resistive RAM.

A particular reference to "logic" refers to structure that performs a function or functions. An example of logic includes circuitry that is arranged to perform those function (s). For example, such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnect, by way of example. Such elements may be provided as custom circuits or standard cell libraries, macros, or at other levels of abstraction. Such elements may be interconnected in a specific arrangement. Logic may include circuitry that is fixed function and circuitry can be programmed to perform a function or functions; such programming may be provided from a firmware or software update or control mechanism. Logic identified to perform one function may also include logic that implements a constituent function or sub-process. In an example, hardware logic has circuitry that implements a fixed function operation, or operations, state machine or process.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget."

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to 'an' item refers to one or more of those items. The term 'comprising' is used herein to mean including the method blocks or elements identified, but that such blocks or elements do not comprise an exclusive list and an apparatus may contain additional blocks or elements and a method may contain additional operations or elements. Furthermore, the blocks, elements and operations are themselves not impliedly closed.

The steps of the methods described herein may be carried out in any suitable order, or simultaneously where appropriate. The arrows between boxes in the figures show one example sequence of method steps but are not intended to exclude other sequences or the performance of multiple steps in parallel. Additionally, individual blocks may be deleted from any of the methods without departing from the spirit and scope of the subject matter described herein. Aspects of any of the examples described above may be combined with aspects of any of the other examples described to form further examples without losing the effect sought. Where elements of the figures are shown connected by arrows, it will be appreciated that these arrows show just one example flow of communications (including data and control messages) between elements. The flow between elements may be in either direction or in both directions.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. Conservative rasterization hardware comprising:
   a plurality of first hardware sub-units each arranged to calculate, for a different edge of a primitive, an outer coverage result for the edge and an inner coverage result for the edge for each pixel in a microtile of a rendering space, wherein the rendering space is sub-divided into a plurality of tiles, each tile is sub-divided into a plurality of microtiles, each microtile comprising an identical arrangement of pixels; and
   wherein at least one first hardware sub-unit comprises one or more hardware arrangements arranged to perform an edge test using a sum-of-products for the edge, the at least one hardware arrangement comprising:
   a microtile component hardware element comprising hardware logic arranged to calculate a first output using the sum-of-products and coordinates of a microtile within a tile in the rendering space,
   a plurality of pixel component hardware elements, each comprising hardware logic arranged to calculate one of a plurality of second outputs using the sum-of-products and coordinates for different pixels defined relative to an origin of the microtile,
   two subsample component hardware elements, each comprising hardware logic arranged to calculate a third output using the sum-of-products and coordinates for a different pixel corner position defined relative to an origin of a pixel, and
   a plurality of adders arranged to generate a plurality of output results for the sum-of-products in parallel by combining, for each output result, a different combination of the first output, one of the plurality of second outputs and a third output.

2. The conservative rasterization hardware according to claim 1, wherein the at least one first hardware sub-unit comprises edge test calculation hardware, the edge test calculation hardware comprising the one or more hardware arrangements each arranged to perform an edge test using a sum-of-products for the edge.

3. The conservative rasterization hardware according to claim 1, wherein one or more of the hardware arrangements further comprises:

a plurality of multiplexers arranged to select the different combinations of the first output, one of the plurality of second outputs and a third output.

4. The conservative rasterization hardware according to claim 1, wherein the plurality of adders comprise:
a plurality of addition and comparison elements, each addition and comparison element arranged to generate a different one of the plurality of outer or inner coverage results by combining a different combination of the first output, one of the plurality of second outputs and a third output.

5. The conservative rasterization hardware according to claim 4, wherein the one or more of the hardware arrangements further comprises:
a first plurality of multiplexers, each of the multiplexers in the first plurality of multiplexers having a plurality of inputs and an output, wherein each input is arranged to receive a different one of the plurality of second outputs from the plurality of pixel component hardware elements and the multiplexer is arranged to select one of the received second outputs and output the selected second output to one of the plurality of addition and comparison elements via the output; and
a second plurality of multiplexers, each of the multiplexers in the second plurality of multiplexers having a plurality of inputs and an output, wherein each input is arranged to receive a different one of the plurality of third outputs from the plurality of subsample component hardware elements and the multiplexer is arranged to select one of the received third outputs and output the selected third output to one of the plurality of addition and comparison elements via the output.

6. The conservative rasterization hardware according to claim 1, wherein the plurality of adders comprises a first subset of the plurality of adders and a second subset of the plurality of adders,
wherein each of the pixel component hardware elements further comprises an input for receiving the first output from the microtile component hardware element and at least one of the first subset of the plurality of adders arranged to sum the first output received from the microtile component hardware element and the second output calculated by the pixel component hardware element to generate an intermediate result, and
wherein the second subset of the plurality of adders comprises:
a plurality of addition and comparison elements, each addition and comparison element arranged to generate a different one of the plurality of outer and inner coverage results by summing a different combination of one of the intermediate results and a third output.

7. The conservative rasterization hardware according to claim 6, wherein one or more of the hardware arrangements further comprises:
a first plurality of multiplexers, each of the multiplexers in the first plurality of multiplexers having a plurality of inputs and an output, wherein each input is arranged to receive a different one of the intermediate results from the plurality of pixel component hardware elements and the multiplexer is arranged to select one of the received intermediate results and output the selected intermediate result to one of the plurality of addition and comparison elements via the output; and
a second plurality of multiplexers, each of the multiplexers in the second plurality of multiplexers having a plurality of inputs and an output, wherein each input is arranged to receive a different one of plurality of third outputs from the plurality of subsample component hardware elements and the multiplexer is arranged to select one of the received third outputs and output the selected third output to one of the plurality of addition and comparison elements via the output.

8. The conservative rasterization hardware according to claim 1, wherein each output result generated by the hardware arrangement comprises a single bit.

9. The conservative rasterization hardware according to claim 8, wherein the single bit comprises a most significant bit of the sum of the first output, one of the plurality of second outputs and a third output.

10. The conservative rasterization hardware according to claim 9, further comprising a decision unit, the decision unit comprising an input for receiving the first output from the microtile component hardware element and hardware logic arranged to determine whether any combination of a second output and a third output, when added to the first output, could result in an output result having a different sign to the first output, and in response to determining that the combination could not result in an output having a different sign to the first output, to output a most significant bit of the first output.

11. A non-transitory computer readable storage medium having stored thereon a computer readable dataset description of an integrated circuit that, when processed in an integrated circuit manufacturing system, causes the integrated circuit manufacturing system to manufacture conservative rasterization hardware as set forth in claim 1.

12. An integrated circuit manufacturing system comprising:
a non-transitory computer readable storage medium having stored thereon a computer readable dataset description of an integrated circuit that describes conservative rasterization hardware as set forth in claim 1;
a layout processing system configured to process the integrated circuit dataset description so as to generate a circuit layout description of an integrated circuit embodying the conservative rasterization hardware; and
an integrated circuit generation system configured to manufacture the conservative rasterization hardware according to the circuit layout description.

13. A method of performing conservative rasterization in conservative rasterization hardware, the method comprising:
calculating, in each of a plurality of first hardware sub-units, for a different edge of a primitive, an outer coverage result for the edge and an inner coverage result for the edge for each pixel in a microtile of a rendering space, wherein the rendering space is sub-divided into a plurality of tiles, each tile is sub-divided into a plurality of microtiles, each microtile comprising an identical arrangement of pixels; and
wherein calculating for an edge of a primitive, an outer coverage result for the edge and an inner coverage result for the edge for each pixel in a microtile comprises:
in a first hardware element, calculating a first output using a sum-of-products of the edge and coordinates of a microtile within a tile in the rendering space,
in each of a plurality of second hardware elements, calculating a second output using the sum-of-products and coordinates of different pixels defined relative to an origin of the microtile, in each of two third hardware elements, calculating a third output using the sum-of-products and coordinates of a different pixel corner position defined relative to an origin of a pixel; and combining, for each output result, a different combination of the first output, one of the plurality of second outputs and a third output.

14. The method of claim 13, further comprising calculating, for a pixel in a microtile, an outer coverage result for the primitive and an inner coverage result for the primitive comprises:

combining outer coverage results for the pixel for each edge of the primitive in a first plurality of AND gates, and combining inner coverage results for the pixel for each edge of the primitive in a second plurality of AND gates.

15. Conservative rasterization hardware configured to perform the method of claim 13.

16. The conservative rasterization hardware of claim 15, wherein the conservative rasterization hardware is embodied on an integrated circuit.

17. A non-transitory computer readable storage medium having stored thereon computer executable code that when executed causes at least one processor to perform conservative rasterization in conservative rasterization hardware, the method comprising:

calculating, in each of a plurality of first hardware sub-units, for a different edge of a primitive, an outer coverage result for the edge and an inner coverage result for the edge for each pixel in a microtile of a rendering space, wherein the rendering space is sub-divided into a plurality of tiles, each tile is sub-divided into a plurality of microtiles, each microtile comprising an identical arrangement of pixels; and wherein calculating for an edge of a primitive, an outer coverage result for the edge and an inner coverage result for the edge for each pixel in a microtile comprises:

in a first hardware element, calculating a first output using a sum-of-products of the edge and coordinates of a microtile within a tile in the rendering space, in each of a plurality of second hardware elements, calculating a second output using the sum-of-products and coordinates of different pixels defined relative to an origin of the microtile, in each of two third hardware elements, calculating a third output using the sum-of-products and coordinates of a different pixel corner position defined relative to an origin of a pixel; and combining, for each output result, a different combination of the first output, one of the plurality of second outputs and a third output.

* * * * *